United States Patent
Tejerina

(10) Patent No.: US 9,500,515 B2
(45) Date of Patent: Nov. 22, 2016

(54) MULTIFUNCTIONAL WEARABLE AUDIO-SENSING ELECTRONIC DEVICE

(71) Applicant: Mass Moment LLC, New York, NY (US)

(72) Inventor: Andrew George Tejerina, New York, NY (US)

(73) Assignee: Mass Moment LLC, New York, NY (US)

( * ) Notice: Subject to any disclaimer, the term of this patent is extended or adjusted under 35 U.S.C. 154(b) by 69 days.

(21) Appl. No.: 14/518,314

(22) Filed: Oct. 20, 2014

(65) Prior Publication Data
US 2015/0110279 A1    Apr. 23, 2015

Related U.S. Application Data

(60) Provisional application No. 61/893,574, filed on Oct. 21, 2013.

(51) Int. Cl.
*H04R 29/00* (2006.01)
*G01H 3/14* (2006.01)
(Continued)

(52) U.S. Cl.
CPC .................. *G01H 3/14* (2013.01)

(58) Field of Classification Search
CPC ........ G06F 1/163; G06F 3/017; G06F 3/012; G06F 17/30277; G06F 3/014; G06F 3/14; G06F 3/167; H04R 2499/11; H04R 1/028; H04R 2430/01; H04R 2420/07; H04R 2499/15; H04R 29/008; H04R 2201/023; H04R 2430/20; H04R 29/00
USPC ................. 381/57, 385, 56; 340/407.1, 4.4, 340/539.11; 367/107, 199, 99; 455/556.1, 455/575.6
See application file for complete search history.

(56) References Cited

U.S. PATENT DOCUMENTS 3,786,628 A    1/1974    Fossard et al.
3,810,170 A    5/1974    Zinsmeister
(Continued)

FOREIGN PATENT DOCUMENTS

JP    57022584    2/1982
JP    60146176    8/1985
(Continued)

OTHER PUBLICATIONS

Alerting and Communicating Devices for Deaf and Hard of Hearing People; Gallaudet University; retrieved from: http://www.gallaudet.edu/clerc_center/information_and_resources/info_to_go/hearing_and_communication_technology/alerting_devices/alerting_and_comm_dev_for_deaf_and_hoh_ppl.html; Oct. 19, 2012; 6 pgs.

(Continued)

*Primary Examiner* — Paul S Kim
*Assistant Examiner* — Norman Yu
(74) *Attorney, Agent, or Firm* — Chiesa Shahinian & Giantomasi PC

(57) ABSTRACT

A multifunctional wearable audio-sensing electronic device is disclosed in which audio is detected, detected audio is analyzed to determine characteristics of the audio, a warning is generated in response to determining that a decibel level of the detected audio is physically harmful, when the wearable audio-sensing electronic device is in a musical tuner mode, a deviation of the audio from a pre-determined audio characteristics of a musical instrument is displayed, when the wearable audio-sensing electronic device is in a hearing aid mode, an identification of the audio and a direction from which the audio originates is displayed, when the wearable audio-sensing electronic device is in an ambiance indicator mode, a visual representation of an audio ambience is displayed, and when the wearable audio-sensing electronic device is in an audio recorder mode, the audio is recorded to the memory and played back.

19 Claims, 2 Drawing Sheets

(51) Int. Cl.
  *H04R 25/00* (2006.01)
  *H03G 3/00* (2006.01)

(56) References Cited

U.S. PATENT DOCUMENTS

| | | | |
|---|---|---|---|
| 3,919,834 A | 11/1975 | Murakami et al. | |
| 4,312,044 A | 1/1982 | Baba | |
| 4,365,238 A | 12/1982 | Kollin | |
| 4,553,138 A | 11/1985 | Nakanishi et al. | |
| 4,812,821 A | 3/1989 | Santy et al. | |
| 5,019,805 A | 5/1991 | Curl et al. | |
| 5,877,695 A | 3/1999 | Kubes et al. | |
| 5,973,612 A | 10/1999 | Deo et al. | |
| 6,411,198 B1 | 6/2002 | Hirai et al. | |
| 6,527,610 B1 | 3/2003 | Hornsby et al. | |
| 6,894,212 B2 | 5/2005 | Capano | |
| 6,975,240 B1 | 12/2005 | Deacon | |
| 7,126,467 B2 | 10/2006 | Albert et al. | |
| 7,199,720 B1* | 4/2007 | Shapiro | G01H 3/10 340/407.1 |
| 7,285,710 B1 | 10/2007 | Wallace | |
| 7,618,260 B2 | 11/2009 | Daniel et al. | |
| 7,915,510 B2 | 3/2011 | Ueno et al. | |
| 8,269,625 B2 | 9/2012 | Hoy et al. | |
| 8,493,204 B2* | 7/2013 | Wong | G01S 3/8036 340/4.4 |
| 2001/0010663 A1* | 8/2001 | Nakazawa | G06T 13/205 369/2 |
| 2005/0013197 A1 | 1/2005 | Chung et al. | |
| 2005/0204898 A1 | 9/2005 | Adams et al. | |
| 2009/0076816 A1 | 3/2009 | Bradford et al. | |
| 2009/0134982 A1 | 5/2009 | Robertson et al. | |
| 2009/0164219 A1* | 6/2009 | Yeung | G04C 3/002 704/258 |
| 2012/0243379 A1 | 9/2012 | Balli | |

FOREIGN PATENT DOCUMENTS

| | | |
|---|---|---|
| JP | 2153393 | 6/1990 |
| JP | 2007101803 | 4/2007 |
| JP | 4523556 | 8/2010 |

OTHER PUBLICATIONS

Bellman Visit Pager BE 1230; Technical Solutions Jun. 2005; Rehabmart.com; retrieved from: http://www.rehabmart.com/PDFs/HC-VISIT_PAGREC_usermanual.pdf; Jul. 25, 2014; pp. 16-18.

Universal Mini Chromatic Tuner w/Key Ring; DX deal extreme; retrieved from: http://www.dx.com/p/universal-mini-chromatic-tuner-w-key-ring-black-1-x-cr2032-179786; Jan. 8, 2013; 1 pg.

Shargorodsky et al., "Change in Prevalence of Hearing Loss in US Adolescents," Aug. 18, 2010, JAMA, the Journal of the American Medical Association, vol. 304, No. 7, 9 pgs.

Schink et al., "Incidence and Relative Risk of Hearing Disorders in Professional Musicians," OEM Online First, published on Apr. 30, 2014, 6 pgs.

"The 2015 NAMM Global Report," Jul. 6, 2015, the National Association of Music Merchants (NAMM), pp. 1-242.

* cited by examiner

FIG. 2
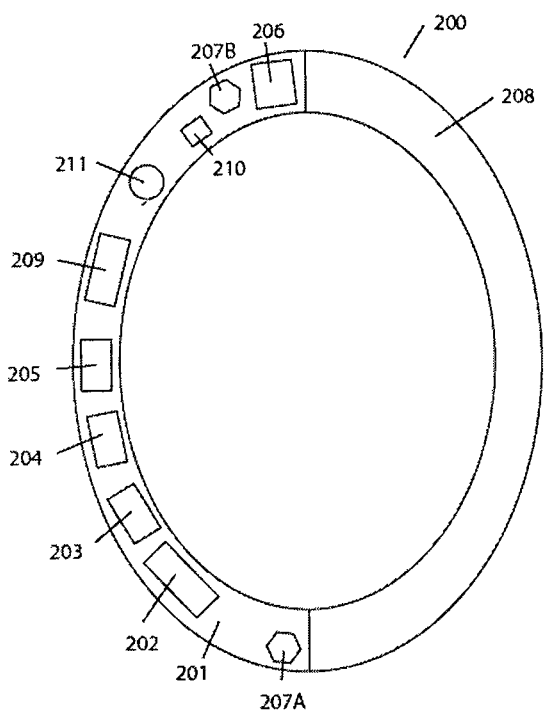
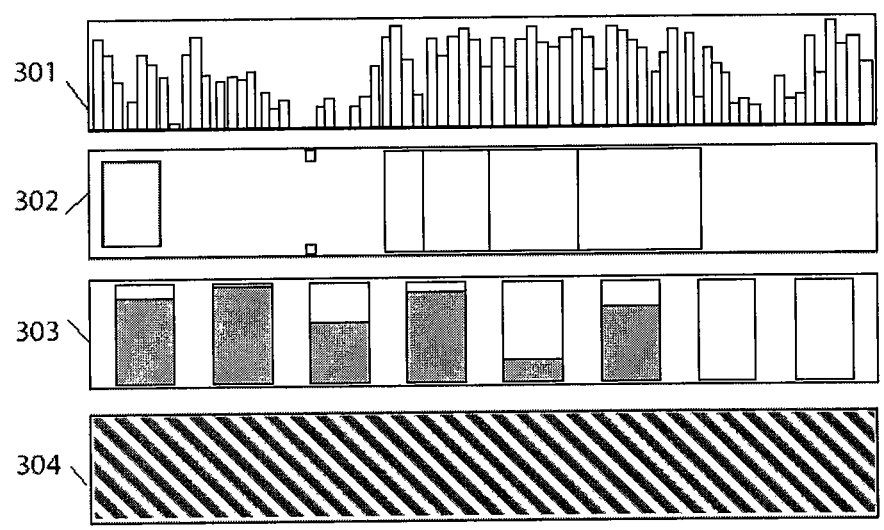
Fig. 3

MULTIFUNCTIONAL WEARABLE AUDIO-SENSING ELECTRONIC DEVICE

CROSS-REFERENCE TO RELATED APPLICATION

This application claims the benefit of U.S. Provisional Application No. 61/893,574, filed Oct. 21, 2013, incorporated herein by reference in its entirety.

BACKGROUND

With the emergence of multifunctional electronic microprocessors, portable computing devices are increasingly prevalent in numerous aspects of modern life. As computers become more advanced, portable multifunctional audio-sensing electronic devices augment users' perception of the physical world.

In some cases portable audio-sensing electronic devices help the users to optimize and improve their daily routine. In other cases portable audio-sensing electronic devices help hearing impaired users, for whom it is difficult to hear the sounds of the surrounding environment, to improve the quality of life. While there are many devices that may record sound or can assist the hearing impaired users, these devices have many deficiencies that undermine their value.

BRIEF SUMMARY

A multifunctional audio-sensing electronic device is needed that is aesthetically pleasing, lightweight, easily activated and visible, configured to detect, record and replicate a sound, identify a source and characteristics of a sound of the surrounding environment, and act as a fashion accessory.

This disclosed wearable audio-sensing device belongs to the growing field of wearable technology. The present disclosure relates to a wearable audio sensing device to detect, analyze, store and reproduce sound and display data indicative of the detected sound on a screen.

In an embodiment, the wearable audio-sensing device detects audio, analyzes detected audio to determine characteristics of the audio and generates a warning in response to determining that a decibel level of the detected audio is physically harmful to a human. When the wearable audio-sensing device is in a musical tuner mode, the wearable audio-sensing device displays a deviation from the audio frequencies of the standard western scale, which can be applied to a wide array of instruments including a guitar, piano, trumpet etc. When the wearable audio-sensing device is in a hearing aid mode, the wearable audio-sensing device will identify the source of the sound, based on the pattern of audio frequencies it emits. The device can be set to capture these sound patterns, save them as profiles, and then reference them for identification. When the wearable audio-sensing device is in an ambient indicator mode, the wearable audio-sensing device displays a visual representation of magnitudes of individual frequency components obtained through frequency-domain analysis techniques. When the wearable audio-sensing device is in an audio recorder mode, the wearable audio-sensing device digitizes and stores the audio to the memory and plays back the recorded audio.

Reference is made throughout the present disclosure to certain aspects of the wearable audio-sensing electronic device described herein. Such references to aspects of the presently described wearable audio-sensing electronic device do not limit the scope of the disclosure. Additionally, any examples set forth in this disclosure are not intended to be limiting and merely set forth some of the many possible embodiments for the disclosed multifunctional audio-sensing electronic device. It is to be understood that the phraseology and terminology used herein are for the purpose of description and should not be regarded as limiting.

BRIEF DESCRIPTION OF THE DRAWINGS

FIG. 2 illustrates a schematic view of the wearable audio sensing device, according to an embodiment;

FIG. 3 illustrates various exemplary embodiments of a visual display of the wearable audio sensing device, according to an embodiment.

DETAILED DESCRIPTION

Figure 1:
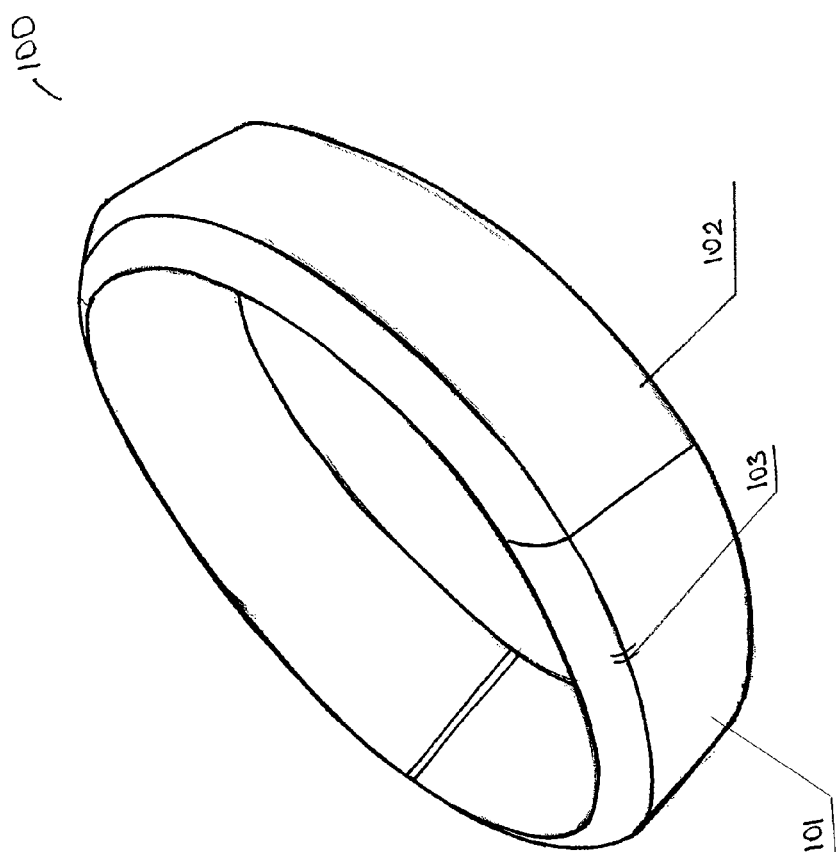
FIG. 1 illustrates a perspective view of a wearable audio sensing device, according to an embodiment.

A device that measures decibels, frequency and captures sound can have a wide array of uses when the inputs are analyzed and displayed intelligently. These functions are increasingly useful when packaged in a convenient wrist-worn unit that is continually powered.

The multifunctional audio-sensing electronic device described herein is a wrist-worn band that can be worn at all times and serves two main purposes: beauty and utility. It can be categorized as a fashion accessory or an audio-sensing aide such as a musical instrument tuner or a sound detector which detects sound and determines a source of the sound and the characteristics of the sound (e.g., harmful intensity levels).

Various embodiments of the wearable audio-sensing electronic device is described in detail with reference to the drawings, wherein reference numerals represent parts and assemblies of the wearable audio-sensing electronic device throughout the several views. Reference to various embodiments does not limit the scope of the tuner disclosed herein. Additionally, any examples set forth in this specification are not intended to be limiting and merely set forth some of the many possible embodiments for the wearable audio-sensing electronic device.

FIG. 1 illustrates a perspective view of an exemplary wearable audio-sensing electronic device 100, according to an embodiment of the present invention. The exemplary wearable audio-sensing electronic device is presented in the form of a wrist-worn bracelet. The depicted wearable audio-sensing electronic device includes an enclosed tubular housing 101 having a hollow cavity to store within a processor device, memory device, battery, input control device, and data communication device. A multi-color LED display screen 102 and microphone 103 are shown to be located on an outer surface of the wearable audio-sensing electronic device 100.

FIG. 2 illustrates a schematic view of the wearable audio sensing device 200. As stated above, the exemplary wearable audio-sensing electronic device 200 includes the enclosed tubular housing having a hollow cavity 201 to store a processor device 202, memory device 203, battery 204, data communication device 205, input control device 206, microphones 207A and 207B, a multi-color LED display screen 208, Bi-Directional (Analog-to-Digital and Digital-to-Analog) Audio Converting Device 209, Electronic 2.5 mm Input/Output Jack 210, and Vibration Motor 211.

Processor 202 may be any type of processor, such as a micro-processor or a digital signal processor. For example, the processor 202 may include both general and special purpose microprocessors, and may be the sole processor or one of multiple processors of the wearable audio-sensing electronic device 200. In an embodiment, the processor 202 may comprise one or more devices containing central processing units (CPU's). The processor 202 is configured to analyze audio data detected by microphones 207A and 207B or received from a remote device via communication device 205. The processor is also configured to execute user commands received via input device 206.

Memory 203 is a data storage communicatively coupled with processor 202. Memory 203 comprises a tangible non-transitory computer readable storage medium. Memory 203 may also include high-speed random access memory, such as dynamic random access memory (DRAM), static random access memory (SRAM), double data rate synchronous dynamic random access memory (DDR RAM), flash drive, or other random access solid state memory devices, and may include non-volatile memory, such as one or more internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), or other non-volatile solid state storage devices. The memory 203 stores computer program instructions that are accessed and executed by the processor 202. Memory 203 also serves as a data storage device to store audio data recorded by the wearable audio-sensing electronic device.

Battery 204 is a power supply source to provide power to the components of the wearable audio-sensing electronic device and maintain operations of the wearable audio-sensing electronic device 200. It is to be understood that battery 204 may be a rechargeable battery permanently installed within the wearable audio-sensing electronic device 200 and periodically charged by an external power source through input device 206. In other embodiment, battery 204 can be a replaceable rechargeable battery or replaceable single-use battery.

Communication device 205 is an electronic signal communication device configured to receive audio data and computer program instructions (e.g., software update for processor 202) from external devices. Communication device 205 is also configured to transmit audio data detected by microphones 207A and 207B and/or stored data in memory 203. In an embodiment, communication device 205 is configured to receive audio data and computer program instructions wirelessly using known electronic communication protocols, such as any existing open network, such as the Internet, or a private network, such as an intranet and/or the extranet, a secure communications protocol, such as secure sockets layer (SSL), or transport layer security (TLS), or any combination thereof. For example, the Internet can provide file transfer, remote log in, cloud-based services, and other services through any known or convenient protocol, such as, but not limited to, the TCP/IP protocol, Open System Interconnections (OSI), File Transfer Protocol (FTP), Universal Plug and Play (UPnP), Internet Small Computer System Interface (iSCSI), Integrated Services Digital Network (ISDN), Synchronous Digital Hierarchy (SDH), etc.

In an embodiment, communication device 205 can receive and transmit data via one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth®, Wi-Fi, Fixed Wireless Data, 2G, 2.5G, 3G, 4G, IMT-Advanced, pre-4G, 3G LTE, 3GPP LTE, LTE Advanced, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, real time messaging protocol (RTMP), SIP/SIMPLE, any other wireless data networks or messaging protocols. In other embodiment, communication device 205 is configured to receive and transmit data via wired connection through input device 206. Communication device 205 may include a USB port which, in combination with a bus used to manage USB data, is used to communicate data between the wearable audio-sensing electronic device 200 and an external device. The USB port can also be used to transfer recorded sounds to other devices. In one embodiment, firmware on the wearable audio-sensing electronic device 200 can be reset while the wearable audio-sensing electronic device 200 is syncing with an external device computer through the USB port or wirelessly.

Input device 206 is a button, port, touch-pad or a designated area on the wearable audio-sensing electronic device 200. In an embodiment, input device 206 is a touch-pad as a part of a touch-screen of multi-color LED display screen. Input device 206 may be used by a user to input commands to operate the wearable audio-sensing electronic device 200 in various modes (i.e., musical tuner, hearing impaired aid, recorder or fashion accessory). Input device 206 may sense at least one of a position and a movement of a finger via capacitive sensing, resistance sensing, or a surface acoustic wave process, among other possibilities. Input device 206 may be configured to sense finger movement in a direction parallel or planar to the surface of input device 206, in a direction normal to the pad surface, or both, and may also be capable of sensing a level of pressure applied to the pad surface. Input 206 may be formed of one or more translucent or transparent insulating layers and one or more translucent or transparent conducting layers.

In an embodiment, microphones 207A and 207B of the wearable audio-sensing electronic device 200 are an analog audio input device, such as a condenser, electret, directional or pressure zone microphone. It is to be understood that microphones 207A and 207B can be a combination of a condenser, electret, directional and pressure zone microphone. The microphones 207A and 207B can incorporate active noise rejection, either analog (i.e., phase cancellation) or digital (i.e., algorithmic), or a combination of the two. The noise rejection can utilize a multi-capsule microphone array to capture, and then translate, the surrounding sound. Additionally, microphones 207A and 207B can either reject or incorporate ambient noise. In an embodiment, the microphone 207A is an outward-facing microphone which is situated on the crown of the wrist when worn and used to capture ambient noise to be displayed in a visually-perceptive form by the multi-color LED display screen. If the wearer is using the wearable audio-sensing electronic device to tune a musical instrument and requires noise reduction, microphone 207A can be disabled. Microphone 207B is an inward-facing microphone oriented to be in a close proximity to the inner portion of the wearer's wrist to capture sound and focus primarily on a musical instrument in the user's hand.

Multi-Color LED display screen 208 is an embedded LED visual display which is configured to display data corresponding to an operational mode of the wearable audio-sensing electronic device 200 (i.e., musical tuner, hearing impaired aid, audio recorder, fashion accessory, harmful sound warning device). In an embodiment the multi-color display screen may be a plasma or liquid crystal display (LCD) monitor for displaying information in various forms (e.g., visual rows and visual columns). Multi-color LED display screen 208 is configured to display Pulse-Width Modulation (PWM) signals in a form of a column of signals to show intensity of captured audio. In an embodiment, at least a portion of the multi-color LED display screen 208 is allocated for a battery charge level indicator to inform the wearer of the wearable audio-sensing electronic device 200 about state of charge of battery 204. Also, at least a portion of the multi-color LED display screen 208 is allocated for data recording/transmission indicator informing the wearer that data is communicated to or from the wearable audio-sensing electronic device 200.

Analog-to-Digital Audio Converter (ADAC) device 209 converts captured audio to digital format before captured audio is processed by CPU 202 or is stored in memory 203 of the wearable audio-sensing electronic device 200.

Vibration motor 211 is configured to generate physical sensory effect causing the wearable audio-sensing electronic device 200 to vibrate. Generated vibration of the wearable audio-sensing electronic device 200 is meant to alert the wearer about detected sound so that the wearer looks at the multi-color LED display screen 208.

In an embodiment, the wearable audio-sensing electronic device 200 is a multifunctional device configured to function in multiple operational modes: (a) musical tuner, (b) audio recorder, (c) hearing aid, (d) damaging noise alarm, and (e) fashion accessory. In order to invoke a particular operational mode or to switch from one operational mode to another operational mode, a user can enter an appropriate input command via the input device 206. The appropriate user input to invoke an operational mode or to switch between operational modes of the wearable audio-sensing electronic device 200 may be via the input device 206, a one-touch of the multi-color LED display screen 208, an audio command, or a particular physical gesture in a close proximity of wearable audio-sensing electronic device 200 (i.e., haptic input command). It is to be understood that more than one operational mode can be concurrently active on the wearable audio-sensing electronic device 200.

In one operational mode, the wearable audio-sensing electronic device 200 is configured to function as a musical tuner. Maintaining a musical instrument in proper tune is essential for operation and enjoyment of the instrument. Many tuners, especially those for stringed instruments, require that the user hold the tuner in hand while engaging the sound-producing portion of an instrument (like the string on a guitar). This typically prevents the user from being able to perform music while also tuning. Pedal tuners, such as for guitars, are often expensive and are not designed for portability during operation. Some small portable tuners can be operated by attachment to an instrument (such as a portion of a guitar body). However, these tuners often have, by necessity, small displays that are remote from the user or the operating portion of the instrument, which can interfere with operation of the instrument or reduce visibility.

According to an embodiment, the wearable audio-sensing electronic device 200 is worn on a wrist of a user who tunes musical instruments. When the wearable audio-sensing electronic device 200 is set to be in the "music tuner" mode by the user, the wearable audio-sensing electronic device 200 detects, via microphone 207B, a sound generated by the musical instrument and visually displays the characteristics of the detected sound on the multi-color LED display screen. The frequency of a sound determines its audible pitch, and when the unit is set to "tuning" mode it can track the frequency of the sounds it hears relative to the twelve (12) notes in the western scale. It can then indicate the characteristics of a sound to the wearer, i.e., (sound is sharp, flat, or matching a note). Unlike many tuners, where a note must be preset on the unit, such as the case with guitar tuners (EADGBE), wearable audio-sensing electronic device 200 determines any note and therefore is useful for tuning any instrument, or even alternative tunings of instruments. In an embodiment, the wearable audio-sensing electronic device 200 assigns an octave to the notes, through frequency, so proper range of the pitch is also identified. If the frequency matches one of the twelve (12) notes on the western chromatic scale, the display will present a visual presentation which is different from a visual presentation of the sounds that are outside of the scale. This way, the wearer of the wearable audio-sensing electronic device 200 can utilize the unit to tune an instrument. Advantages of a wrist worn tuner include hands-free operation and ready availability. Also, for many instruments, the wearable audio-sensing electronic device 200 is conveniently oriented and located proximally to the audio source when worn on the wrist.

The fact that the wearable audio-sensing electronic device 200 is wrist mounted provides several advantages for tuning a musical instrument. Firstly, proximity to the sound hole or strings on many instruments greatly reduces sound interference. Also, it allows the wearer to continue playing while tuning since the operation is hands-free.

The wearable audio-sensing electronic device 200 functioning as a musical tuner can serve many purposes to a working musician. In a performance scenario, the wearer can receive constant feedback on whether his instrument, or his band-mates' instruments are in tune. He can even recognize specific notes as they are being played, since the tuner is not limited to identifying "open strings" as many are, and will differentiate between octaves.

In one embodiment, the user does not need to physically switch a mode of the wearable audio-sensing electronic device 200 to the "musical tuner" to tune the instrument. The wearable audio-sensing electronic device 200 will automatically detect and indicate notes, their octave, and whether they are sharp/flat. This allows the wearable audio-sensing electronic device 200 to tune a range of instruments, such as, but not limited to, guitars, basses, flutes, and pianos. It can also be used to configure non-standard tuning patterns. In another embodiment, the user can select a specific note for tuning.

Depending on the mode, the multi-color LED display screen 208 of the wearable audio-sensing electronic device 200 can have a wide array of appearances. FIG. 3 illustrates exemplary embodiments of a visual display of the wearable audio sensing device 200 when it is set to various operational modes.

View 301 of FIG. 3 is an exemplary view of the screen when the wearable audio-sensing electronic device 200 is functioning in "listening" mode, the spectral analysis of ambient sound, will resemble a graphic equalizer with a field of bars rising and falling. Decibels will be communicated on the y-axis (height of the bars) while the frequency components will be on the x-axis (which bars along the baseline are active).

View 302 of FIG. 3 is an exemplary view of the screen when the wearable audio-sensing electronic device 200 is in "musical tuning" operational mode. In this operational mode, the multi-color LED display screen 208 may display a row of light emitting diodes (LEDs) which correspond to musical semitones. The display array shifts to a single needle (1-vertical LED row) as a point of detection. The position of the needle is representative of deviation in cents from the nearest note in the 12 note Western Scale. As the instrument being tuned approaches the nearest note, the "sliding" LED needle will align on center within the display and shift color—indicating that the instrument matches the desired note. In an embodiment, the multi-color LED display screen 208 will include an alphanumeric section adjacent to this sliding needle, which indicates the note which is being matched.

The wearable audio-sensing electronic device 200 detects audio data, analyzes audio data using automatic chromatic tuning and real time Discrete Fast Fourier Transform (FFT) audio spectrum analysis of ambient sound field. The analysis of the audio data enables the wearable audio-sensing electronic device 200 to determine the characteristics (e.g., frequency) of the detected sound. Based on the difference between the fundamental frequency and an internal reference frequency an LED column indicator shifts proportionally from a fixed point based on the desired reference frequency. Tuning direction is annunciated by causing the selected multi-colored LED display screen to display a first color if flat, a different color if sharp, and yet another color if in tune.

In another embodiment, the multi-color LED display screen 208 displays an "equalizer" array reflecting changes in the sound, including frequency, volume, pressure, and speed, as well as a scale display which can indicate the note that is being detected when the wearable audio-sensing electronic device 200 is functioning as a musical tuner. The scale display can also indicate whether the frequency of the sound matches that note exactly, or is slightly above or below that point. These two displays can be organized in a variety of orientations.

In another operational mode, the wearable audio-sensing electronic device 200 is configured to record, reproduce and transmit audio data. The wearable audio-sensing electronic device 200 may be configured to detect and record audio data continuously or the wearable audio-sensing electronic device 200 may be configured to detect and record audio data upon detecting appropriate input from the user via input device 206. For example, if a user-musician is playing a musical instrument at home, the user can use the wearable audio-sensing electronic device 200 to save musical thoughts by activating, via input device 206, the recording functionality of the wearable audio-sensing electronic device 200.

In an embodiment, the appropriate user input to activate the recording functionality of the wearable audio-sensing electronic device 200 via input device 206 may be a one-touch of the multi-color LED display screen 208, an audio command, or a particular physical gesture in a close proximity of wearable audio-sensing electronic device 200 (i.e., haptic input command). For example, if the user-wearer of the wearable audio-sensing electronic device 200 comes across a beautiful melody or progression, user can promptly activate the recording function of the wearable audio-sensing electronic device 200, via input device 206, to record his creative idea in a form of sound snippets before it can be forgotten. Upon detecting user's input command to record audio data, the wearable audio-sensing electronic device 200 detects audio data via microphones 207A and 207B and saves the detected audio data in memory 203. In other embodiment, upon detecting user's input command to record audio data, the wearable audio-sensing electronic device 200 may be configured to store the detected audio data in a remote device without storing the detected audio data in memory 203. That is, upon detecting user's input command to record audio data, the wearable audio-sensing electronic device 200 is configured to transmit the detected audio data to a remote device to be stored in a data storage unit of the remote device.

View 303 in FIG. 3 is an exemplary view of the screen when the wearable audio-sensing electronic device 200 is in the "record, reproduce and transmit" operational mode when the multi-color LED display screen 208 can be utilized as a dashboard for internal functionalities such as selecting memory banks of recorded sound, audio playback, checking battery life, switching color modes, controlling data uploads and more.

In an embodiment, upon detecting user's input command to record audio data, the wearable audio-sensing electronic device 200 can be configured to simultaneously (and/or concurrently) save the detected audio data in memory 203 and transmit the detected audio data to be stored in a remote device. The wearable audio-sensing electronic device 200 may be configured to generate an identifier (e.g., by date, time, etc.) for the recorded audio data snippet so that the recorded audio data snippet is easily located by the user at later time. The recording functionality of the wearable audio-sensing electronic device 200 is also useful for non-musicians who wish to save audio notes for future reference.

In an embodiment, activation of the recording function on the wearable audio-sensing electronic device 200 can be achieved in the scope of a "one-touch-recording" operational mode where recording will be terminated when the user activates the input device 206 again. Alternatively, recording can be terminated by processor 202 automatically after detecting an extended period of silence. Recorded sound snippets can be saved as separate audio files, which can be retrieved and transmitted, via communication device 205 (e.g., wirelessly via Bluetooth or via USB port), to another device individually or combined.

In an embodiment, the wearable audio-sensing electronic device 200 can be configured to initiate playback of the recorded audio data on a remote device. For example, a wearer of the wearable audio-sensing electronic device 200 may connect headphones to the wearable audio-sensing electronic device 200 via data communication device 205. Playback functionality can be activated by an appropriate user input via input device 206. Upon receiving a "playback" input command relating to a particular stored audio data, the wearable audio-sensing electronic device 200 identifies a memory location of the particular stored audio data (e.g., memory location in memory 203 or memory location on a remote device) and initiates playback.

In another operational mode, the wearable audio-sensing electronic device 200 is configured to function as an audio-augmenting device for hearing impaired. For users who already have significant hearing loss, the multi-color LED display screen 208 displays identification of sound on the wearable audio-sensing electronic device 200 to alert the wearer about sudden noises including a doorbell ringing or a fire-alarm sounding. Traditionally, the hearing impaired must rely on separate signaling systems, which are attached to each individual appliance that has an audible notification (doorbell, phone, smoke alarm). Instead of connecting all of these separate appliances to signaling systems, the wearable audio-sensing electronic device 200 is configured to identify audio data corresponding to a particular appliance and notify the users when a particular appliance is active. Identification of various appliances by the wearable audio-sensing electronic device 200 may be achieved by difference embodiments.

In addition to identifying a source and characteristics of a sound, the wearable audio-sensing electronic device 200 is configured to determine a direction from which the detected sound is originated and proximity of the source of the sound relative to the location of the wearer of the wearable audio-sensing electronic device 200. Specifically, the wearable audio-sensing electronic device 200 is configured to capture the sound, based on the analysis of the characteristics of the captured sound and comparison of the captured sound with the stored audio data profiles, identify the nature of the sound, identify the direction from which the captured sound originates and the intensity of the sound, and warn the user by displaying on the multi-color LED display screen 208 an indication and direction of the sound by displaying an identification of the captured sound along with an indication of a direction from which the sound is originates. For example, a user stands at a crosswalk and attempts to cross a street when an oncoming car honks at the user to alert to the user that the car is driving through the crosswalk. In such a case, the wearable audio-sensing electronic device 200 is configured to capture the sound, based on the analysis of the characteristics of the captured sound and comparison of the captured sound with the stored audio data profiles, identify the sound as a honking signal of an automobile, identify the direction from which the captured sound originates and the intensity of the sound (e.g., to determine how fast the automobile is approaching the user), and warn the user by displaying on the multi-color LED display screen 208 of the wearable audio-sensing electronic device 200 an indication of the sound (alphanumeric or symbol) and direction (e.g., an arrow) from which the honking signal originates.

A first embodiment includes using pre-loaded (in memory 203 or in memory of remote devices) audio data profiles containing specific frequencies and patterns of frequencies. In such audio data profiles the specific frequencies and patterns of frequencies are associated with a source of the sound. A second embodiment includes capturing audio data (i.e., unique tones) by the wearable audio-sensing electronic device 200 of an appliance by activating the input device 206 when the user wants to add a new audio data profile associated with captured audio data. Specifically, the wearable audio-sensing electronic device 200 is instructed by the user to capture and store information about the audio data interpreted by utilizing Digital Signal Processing (DSP) techniques (e.g., pitch detection, pattern recognition, Mel Frequency Cepstral Coefficients (MFCC's), Linear Predictive Coding (LPC), and the like) in association with a unique identifier of the captured data. The wearable audio-sensing electronic device 200 is configured to alert the wearer by displaying a unique identifier associated with the captured data on the multi-color LED display screen 208 when the wearable audio-sensing electronic device 200 detects that the received audio matches the stored audio data. The displayed unique identifier can be an alphanumeric indicator (e.g., word "doorbell") or a symbol or a logo (e.g., depiction of a ringing bell). The wearer may select a unique identifier from a profile of unique identifiers stored in memory 203 or stored in a remote device with which the wearable audio-sensing electronic device 200 communicates via the communication device 205. In an embodiment, the wearable audio-sensing electronic device 200 is configured to alert the wearer about detected sound by vibrating so that the wearer looks at the multi-color LED display screen to recognize the source of the sound.

For users who are conscious about preventing hearing damage, the wearable audio-sensing electronic device 200 may be configured to warn the user when the user is exposed to damaging audio environments. The analysis of the captured data enables the wearable audio-sensing electronic device 200 to identify specific decibel levels that reach or exceed thresholds and, as such, are damaging to the human ear. For example, if users are wearing the wearable audio-sensing electronic device 200 during their daily commute to work, and the train or subway they ride triggers the sound pressure warning, users can be alerted to take measures to avoid this and protect their long-term hearing. In another example, if the audio levels at the musical performance are damaging to the hearing of a musician-wearer of the wearable audio-sensing electronic device 200, the wearable audio-sensing electronic device 200 will notify the wearer so that the wearer could adjust the sound levels for his/her safety and audience members alike. Alternatively, the device may also store a running history or moving average of previous decibel levels to warn users of overexposure to sound pressure levels that may not be harmful in very small doses, but are in fact harmful when consistent exposure is experienced over a given period of time.

The functionality of the wearable audio-sensing electronic device 200 to identify a source of a sound and a direction from which the detected sound originates enables the wearable audio-sensing electronic device 200 to assist the user to minimize the exposure to the harmful audio environments. For example, a construction worker who wears the wearable audio-sensing electronic device 200 may be alerted that an noise level originating from one of the construction equipment may be harmful to the worker's hearing so the construction worker may take necessary steps to mitigate or avoid the potential damage by either putting on noise-cancelling headphones or moving farther away from the source of the damaging noise till the wearable audio-sensing electronic device 200 ceases to indicate that the captured noise is damaging to the worker.

View 304 of FIG. 3 is an exemplary view of the screen when the wearable audio-sensing electronic device 200 is functioning as a protective device identifying harmful audio environments to which a wearer of the wearable audio-sensing electronic device 200 may be subjected. The multi-color LED display screen 208 will display striking colors and arrays to warn the user of hazardous audio levels. This warning can be paired with a vibration, to alert a user who may not be actively viewing the multi-color LED display screen 208 of the wearable audio-sensing electronic device 200. It is to be understood that views 301-304 of FIG. 3 are presented solely for illustrative purposes and that other views of the multi-color LED display screen 208 are may be invoked depending on the operational mode of the wearable audio-sensing electronic device 200.

In another operational mode, the wearable audio-sensing electronic device 200 is configured to function as an interactive fashion accessory. As the wearable audio-sensing electronic device 200 is configured to display captured audio data such that each audio tone and note (i.e., frequency) may be uniquely represented on the multi-color LED display screen 208 of the wearable audio-sensing electronic device 200. The captured audio data may be presented in the form of a series of moving bars, colors, notes and other visually-recognizable representations associated with ambient sounds. Constant changes in ambient sound surrounding the wearable audio-sensing electronic device 200 will generate pleasing and engaging visual effects on the multi-color LED display screen 208. The LED display screen 208 may also visualize non-sound oriented patterns, including but not limited to generative algorithms, preset patterns stored in memory, and pseudo-random sequences. By monitoring their wearable audio-sensing electronic device 200 reflecting the changes in ambient sound, users can delight at the ready identification of everyday sounds, knowing, for example, that their office elevator "dings" at an "A" (440 hz) or their phone ring begins with a "C" 523 hz. Also, the functionality of the wearable audio-sensing electronic device 200 enables curious users to identify the notes of everyday sounds (e.g., elevator ding, instant message chime), as some gifted musicians with perfect pitch are able to do. If the wearable audio-sensing electronic devices 200 are worn by several people located in close proximity to each other, and their frequency visualizations are synching with surrounding ambiance (e.g., music), it can add another element of entertainment, the same way electronic dance music enthusiasts marvel at "intelligent lighting" that paces with the music.

In an embodiment, due to its multi-utility, the wearable audio-sensing electronic device 200 can consume a substantial amount of power provided by battery 204. Accordingly, the wearable audio-sensing electronic device 200 may need to conserve power provided by the battery 204. In one embodiment, the wearable audio-sensing electronic device 200 can be powered on and off when the user enters an appropriate input command via the input device 206. In another embodiment, the wearable audio-sensing electronic device 200 can enter a low-power "sleep mode" when there is an extended period of silence. The wearable audio-sensing electronic device 200 may automatically "wake-up" when it detects sounds above a specific decibel level for an extended period of time.

It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

The invention claimed is:
1. A wrist-worn audio-sensing electronic device comprising:
a housing having an internal cavity and an exterior portion;
a processor;
a display on the exterior portion of the housing; and
a microphone,
wherein the wrist-worn audio-sensing electronic device, according to a plurality of operational modes of operation, is configured to:
detect audio;
analyze detected audio to determine characteristics of the audio;
generate a warning in response to determining that a decibel level of the detected audio is physically harmful;
when the wrist-worn audio-sensing electronic device is in a musical tuner mode: display a deviation of the audio from a pre-determined audio characteristics of a musical instrument;
when the wrist-worn audio-sensing electronic device is in a hearing aid mode:
display an identification of a source of the audio; and
display a direction from which the audio originates; and
when the wrist-worn audio-sensing electronic device is in an ambiance indicator mode: display a visual representation of an audio ambience.

2. The wrist-worn audio-sensing electronic device of claim 1, further comprising:
a memory;
a battery;
an input device configured to receive user input for selecting one or more of the plurality of operational modes; and
a communication device.

3. The wrist-worn audio sensing electronic device of claim 2, further configured to:
when the wrist-worn audio-sensing electronic device is in an audio recorder mode:
record the audio to the memory; and
playback recorded audio.

4. The wrist-worn audio-sensing electronic device of claim 3, further configured to:
when the wrist-worn audio-sensing electronic device is in an audio recorder mode: transmit the recorded audio to an external device.

5. The wrist-worn audio-sensing electronic device of claim 1, wherein the warning comprises a visual warning on the display.

6. The wrist-worn audio-sensing electronic device of claim 4, wherein the warning comprises a physically-detectable warning.

7. The wrist-worn audio-sensing electronic device of claim 2, wherein the audio is received from an external device via the input device.

8. A method of operating a wrist-worn audio-sensing electronic device, the method comprising:
detecting audio;
analyzing detected audio to determine characteristics of the audio;
generating a warning in response to determining that a decibel level of the detected audio is physically harmful to a human;
when the wrist-worn audio-sensing electronic device is in a musical tuner mode: displaying a deviation of the audio from a pre-determined audio characteristics of a musical instrument;
when the wrist-worn audio-sensing electronic device is in a hearing aid mode:
displaying an identification of a source of the audio; and
displaying a direction from which the audio originates; and
when the wrist-worn audio-sensing electronic device is in an ambiance indicator mode: displaying a visual representation of an audio ambience.

9. The method of claim 8, further comprising:
when the wrist-worn audio-sensing electronic device is in an audio recorder mode:
recording the audio to a memory; and
playing back recorded audio.

10. The method of claim 8, further comprising:
when the wrist-worn audio-sensing electronic device is in an audio recorder mode: transmitting the recorded audio to an external device.

11. The method of claim 8, wherein generating the warning comprises a generating a visual warning on the display.

12. The method of claim 8, wherein generating the warning comprises generating a physically-detectable warning.

13. The method of claim 8, wherein detecting the audio comprises detecting frequency of the audio exceeding a predetermined threshold.

14. A wrist-worn audio-sensing electronic device comprising:
- a housing having an internal cavity and an exterior portion;
- means for detecting audio;
- means for analyzing detected audio to determine characteristics of the audio;
- means for generating a warning in response to determining that a decibel level of the detected audio is physically harmful;
- when the wrist-worn audio-sensing electronic device is in a musical tuner mode: means for displaying a deviation of the audio from a pre-determined audio characteristics of a musical instrument;
- when the wrist-worn audio-sensing electronic device is in a hearing aid mode:
- means for displaying an identification of a source of the audio; and
- means for displaying a direction from which the audio originates; and
- when the wrist-worn audio-sensing electronic device is in an ambiance indicator mode: means for displaying a visual representation of an audio ambience.

15. The wrist-worn audio-sensing electronic device of claim 14, further comprising:
- when the wrist-worn audio-sensing electronic device is in an audio recorder mode:
- means for recording the audio to the memory; and
- means for playing back recorded audio.

16. The wrist-worn audio-sensing device of claim 14, further comprising:
- when the wrist-worn audio-sensing electronic device is in an audio recorder mode: means for transmitting the recorded audio to an external device.

17. The wrist-worn audio-sensing device of claim 14, wherein the warning comprises a visual warning.

18. The wrist-worn audio-sensing device of claim 14, wherein the warning comprises a physically-detectable warning.

19. The wrist-worn audio-sensing electronic device of claim 14, further comprising:
- means for receiving user input for selecting one or more of a plurality of operational modes of the wrist-worn audio-sensing electronic device.

* * * * *